(12) United States Patent
Springer

(10) Patent No.: US 9,260,165 B1
(45) Date of Patent: Feb. 16, 2016

(54) RELEASABLY ATTACHABLE BOAT RAIL

(71) Applicant: Lawrence T. Springer, Tequesta, FL (US)

(72) Inventor: Lawrence T. Springer, Tequesta, FL (US)

( * ) Notice: Subject to any disclaimer, the term of this patent is extended or adjusted under 35 U.S.C. 154(b) by 0 days.

(21) Appl. No.: 14/459,556

(22) Filed: Aug. 14, 2014

Related U.S. Application Data

(60) Provisional application No. 61/872,034, filed on Aug. 30, 2013.

(51) Int. Cl.
*B63B 29/00* (2006.01)
*B60N 3/02* (2006.01)

(52) U.S. Cl.
CPC .. *B63B 29/00* (2013.01); *B60N 3/02* (2013.01)

(58) Field of Classification Search
CPC ................................ A01K 97/10; B63B 17/04
See application file for complete search history.

(56) References Cited

U.S. PATENT DOCUMENTS

| | | | |
|---|---|---|---|
| 3,964,706 A | 6/1976 | Adams | |
| 4,153,137 A | 5/1979 | Johnson | |
| 4,719,872 A | 1/1988 | Ritten | |
| 4,719,989 A | 1/1988 | Ritten | |
| 4,836,127 A | 6/1989 | Wille | |
| 4,876,980 A * | 10/1989 | Bell, III | 114/364 |
| 5,113,782 A | 5/1992 | McCarty | |
| 5,887,540 A | 3/1999 | Krish, Jr. | |
| 6,487,984 B1 * | 12/2002 | Pape et al. | 114/218 |
| 6,983,823 B1 | 1/2006 | Zumbrunnen | |
| 8,166,905 B2 | 5/2012 | Gratsch | |
| 2012/0048174 A1 * | 3/2012 | Miller et al. | 114/362 |
| 2012/0079978 A1 | 4/2012 | Teel | |

* cited by examiner

*Primary Examiner* — Edwin Swinehart
(74) *Attorney, Agent, or Firm* — Glenn E. Gold; Gold & Rizvi, P.A.

(57) ABSTRACT

A releasably attachable boat rail for assisting passengers aboard a boat is received in a fishing rod holder receiving bore integrated into a gunwale of the boat and comprises a unitary elongated tubular body having a linear segment length and a curved segment. The curved segment terminates at an opposing second end of the unitary elongated tubular body wherein the curved segment provides a curved gripping surface area. A locking portion is defined in a sidewall of the linear segment of the tubular body at the first end thereof and is formed to engage the locking feature in the receiving bore of the boat gunwale wherein the elongated curved tubular body is sized to be partially received within the fishing rod holder receiving bore.

18 Claims, 14 Drawing Sheets

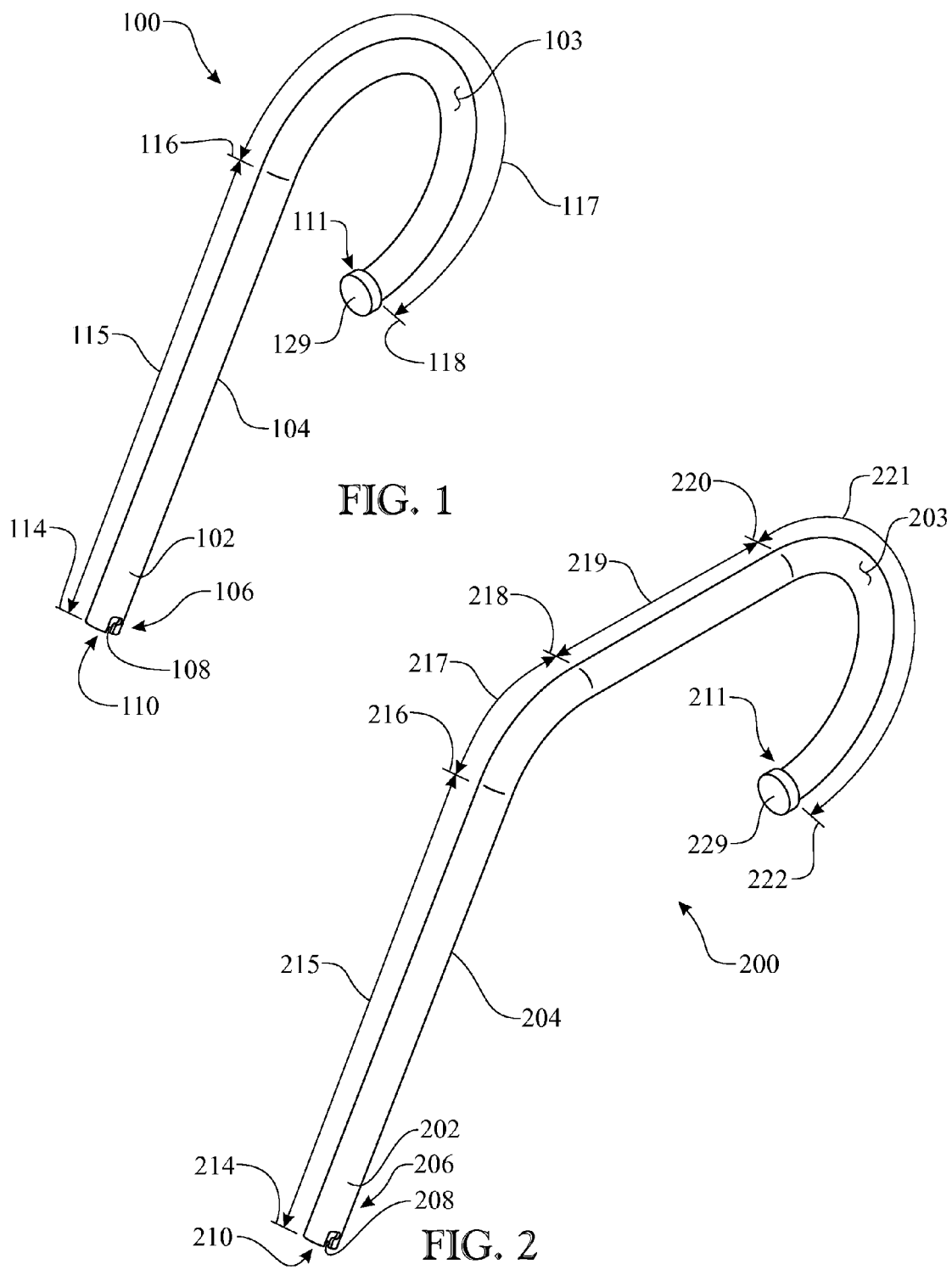

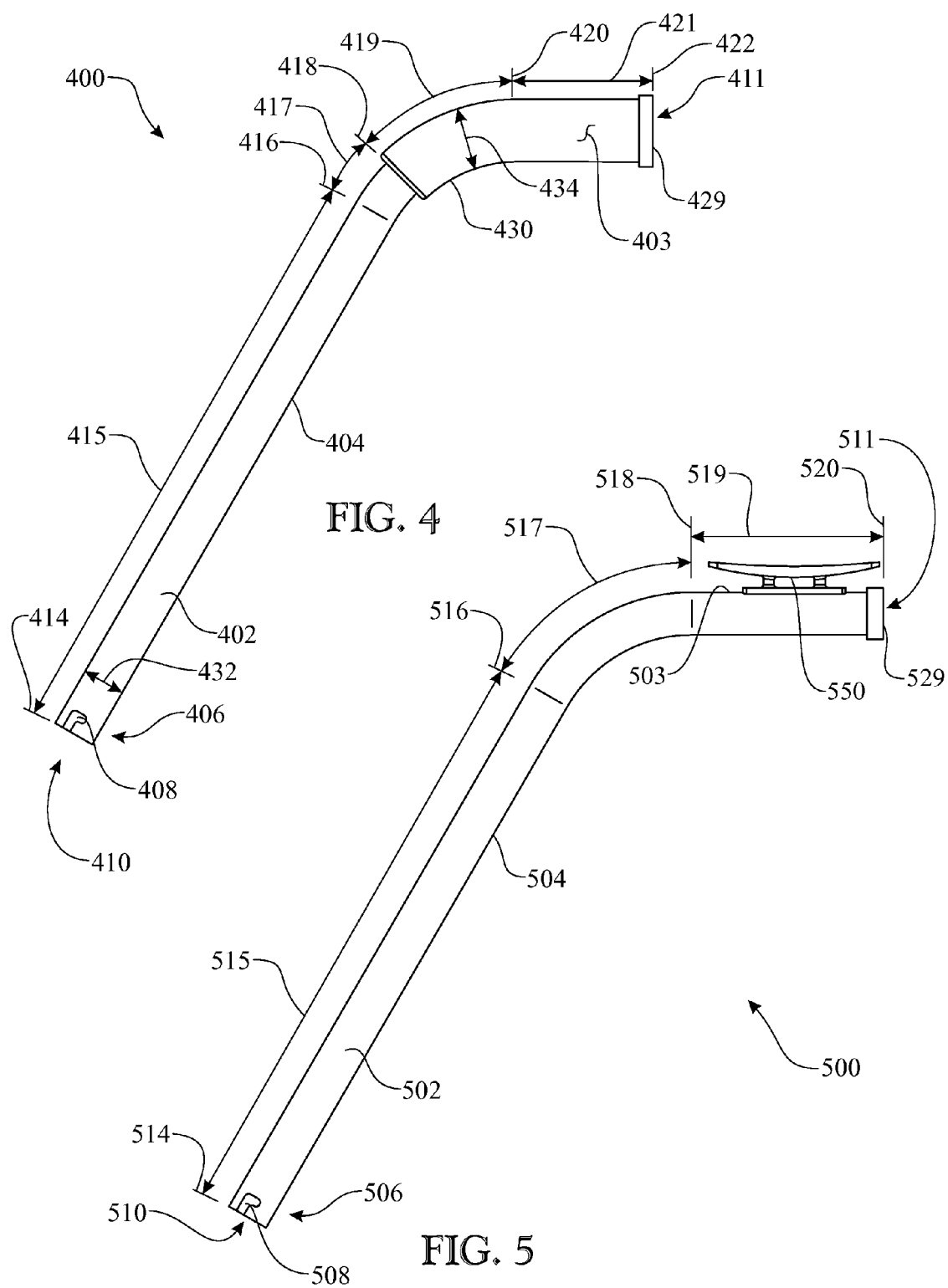

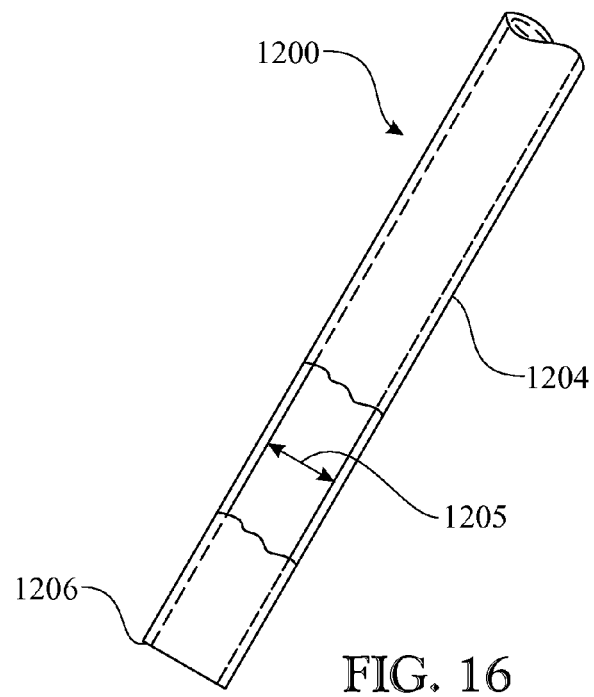
FIG. 16
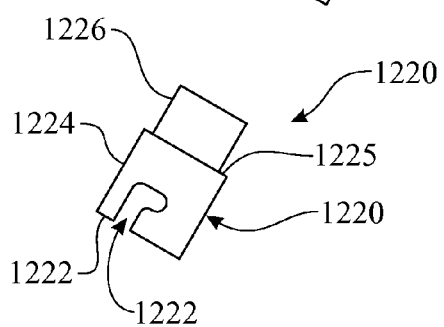
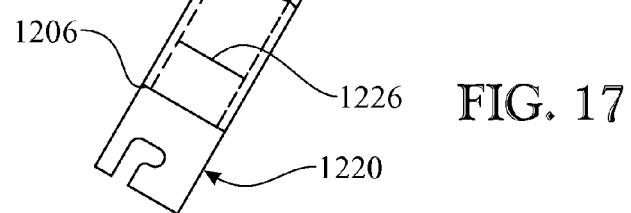
FIG. 17

RELEASABLY ATTACHABLE BOAT RAIL

CROSS-REFERENCE TO RELATED APPLICATION

This Non-Provisional Utility application claims the benefit of U.S. Provisional Patent Application Ser. No. 61/872,034 filed on Aug. 30, 2013, which is incorporated herein in its entirety.

FIELD OF THE INVENTION

The present disclosure generally relates to accessories for recreational boats and, more particularly, to a boarding assist device adapted to releasably engage a rod holder that is integrated into a gunwale.

BACKGROUND OF THE INVENTION

Recreational boating is a broadly enjoyed activity throughout the world. In the United States alone, recent statistics show that more than 12 million recreational vessels are registered, with a vast majority of these being motorboats (46%), personal watercraft (20%), and cabin motorboats (14%) (See "Recreational Boating Statistics 2010," COMDTPUB 16745.24, U.S. Department of Homeland Security, U.S. Coast Guard, Office of Auxiliary and Boating Safety). While these vessels have many styles and structures, a common feature of all watercraft is that passengers have difficulty in boarding, especially with small watercraft, due to the relative movement between a stationary surface, such as a dock or jetty, and a moving surface, such as a boarding platform or loading deck that is undulating relative to the wave motion of the water surface.

Additionally, many users utilize watercraft for diving purposes. Unfortunately, many boats are not manufactured with a boarding assist handrail integrated into the structure of the boat to assist passengers in boarding the boat as they ascend from a body of water. Thus, many owners who desire a boarding assist device are required to separately acquire a handrail in addition to mounting hardware and install the mounting hardware and handrail onto the boat using mounting equipment. Installation of a handrail in this manner is relatively costly, time-consuming, and may result in permanent alteration of the boating structure, all of which are undesirable.

It is a common practice for manufacturers of watercraft to provide a variety of deck fittings for accommodating various accessories, such as trolling motors, fishing rod holders, and the like that aid in greater utilization of the watercraft for use in a variety of boating related activities, such as fishing, and the like. In particular, it is common in the gunwale of vessels to include a number of bore holes or rod holders for the receipt fishing rods.

Accordingly, there remains a need in the art for a boarding assist device for use with watercraft that can be easily secured into a pre-existing structure, such as a rod holder, eliminating the need for additional mounting hardware and equipment, while also being removable in order to allow the rod holder to store fishing rods as desired.

SUMMARY OF THE INVENTION

The present invention overcomes the deficiencies of the known art and the problems that remain unsolved by providing a method and respective apparatus for aiding in the boarding of watercraft through the use of a boarding assist device that is adapted to be releasably engaged with a rod holder.

In accordance with one embodiment of the present invention, a releasably attachable boat rail for assisting passengers aboard a boat is received in a fishing rod holder receiving for integrated into a gunwale of the boat and wherein the receiving bore includes a locking feature therein. The releasable boat rail comprises a unitary elongated tubular body having a linear segment length extending from a first end of the unitary elongated tubular body and transitioning at a second end of the linear segment to a curved segment. The curved segment terminates at an opposing second end of the unitary elongated tubular body wherein the curved segment provides a curved gripping surface area. A locking portion is defined in a sidewall of the linear segment of the tubular body at the first end thereof. The locking portion is formed to engage the locking feature in the receiving bore of the boat gunwale wherein the elongated curved tubular body is sized to be partially received within the fishing rod holder receiving bore in a manner such that the curved segment is disposed exterior to the bore and proximate to an end of the gunwale.

In another aspect, the locking feature in the boat gunwales receiving bore includes a locking pin affixed to an interior sidewall of the fishing rod holder and extends inwardly to the receiving bore. The locking portion defined by the releasable boat rail comprises a channel cut out of the sidewall and is adapted for selectively locking engagement with the locking pin. The locking portion includes a first linear longitudinal channel and a second circumferential channel perpendicular to and intersecting the first linear longitudinal channel.

In still another aspect, the unitary elongated tubular body defines a tubular body hollow chamber which further includes therein a first flotation member proximate to the first end and a second flotation member proximate to the second end.

In yet another aspect, the first and second flotation members are formed of an expandable foam.

In a still further aspect, the first and second foam members are spaced apart one from the other and form in combination with the elongated tubular body a central air pocket therebetween.

In another aspect, the curved segment is a circular arc describing a range of 120 degrees to 180 degrees.

In a further aspect, the curved segment is a circular arc substantially describing 150 degrees.

In yet another aspect, the releasable boat rail further includes a lock fitting having a cylindrical body defining the channel cut out at one end thereof and a neck at an opposite end thereof wherein the neck is telescopically received in the first end of the tubular body.

In another aspect, a releasable boat rail for assisting passengers aboard a boat wherein the releasable boat rail is received in a fishing rod holder receiving bore integrated into a gunwale of the boat and further wherein the receiving bore includes a locking feature therein. The releasable boat rail includes a unitary elongated tubular body includes a first linear segment and a second linear segment having a first curved segment therebetween. The first curved segment extends between a second end of the first linear segment and the first end of the second linear segment and substantially describes an arc of 60 degrees. A second curved segment is positioned at a second end of the second linear segment and describes an arc terminating at an opposite second end of the second curved segment. The second curved segment provides a curved gripping surface area. A locking portion is defined in a sidewall of the elongated curved tubular body at the first end thereof and is formed to engage the locking feature in the receiving bore of the boat gunwale. The elongated curved tubular body is sized to be partially received within the fishing rod holder receiving bore in a manner such that the curved segment is disposed exterior to the bore and proximate to an end of the gunwale.

In another aspect, the locking feature in the boat gunwales receiving bore includes a locking pin affixed to an interior sidewall of the fishing rod holder and extends inwardly to the receiving bore. The locking portion defined by the releasable boat rail comprises a channel cut out of the sidewall and is adapted for selectively locking engagement with the locking pin. The locking portion includes a first linear longitudinal channel and a second circumferential channel perpendicular to and intersecting the first linear longitudinal channel.

In still another aspect, the unitary elongated tubular body defines a tubular body hollow chamber which further includes therein a first flotation member proximate to the first end and a second flotation member proximate to the second end.

In yet another aspect, the first and second flotation members are formed of an expandable foam.

In a still further aspect, the first and second foam members are spaced apart one from the other and form in combination with the elongated tubular body a central air pocket therebetween.

In another aspect, the curved segment is a circular arc describing a range of 120 degrees to 180 degrees.

In a further aspect, the curved segment is a circular arc substantially describing 150 degrees.

In yet another aspect, the releasable boat rail further includes a lock fitting having a cylindrical body defining the channel cut out at one end thereof and a neck at an opposite end thereof wherein the neck is telescopically received in the first end of the tubular body.

In a further aspect, at least one of the linear segments is selectively extendable to adjust a length of the at least one linear segment.

In another aspect, the first linear segment is selectively extendable and the second linear segment is selectively extendable to adjust a length of a respective one of the first and second linear segments.

In yet another aspect, the at least one extendable linear segment includes a first tube segment having a telescoping segment at one end thereof wherein the telescoping segment defines a plurality of substantially equally spaced apertures there along. A second tube segment receives the telescoping segment at an end adjacent to the first tube segment. The second tube segment defines at least one aperture proximate to the end adjacent to the first tube segment. A locking pin engages the at least one aperture defined by the second tube segment and one of the apertures defined by the telescoping segment.

In still a further aspect, a releasable boat rail for supporting a cleat is received in a fishing rod holder receiving bore integrated into a gunwale of the boat wherein the receiving bore includes a locking feature therein. The releasable boat rail includes a unitary elongated tubular body comprising a first linear segment and a second linear segment having a first curved segment therebetween. The first curved segment extends between a second end of the first linear segment and a first end of the second linear segment and substantially describes an arc of 60 degrees. The second linear segment has a top planar surface to which is affixed a cleat. A locking portion is defined in a sidewall of the elongated curved tubular body at the first end thereof and is formed to engage the locking feature in the receiving bore of the boat gunwale. The elongated curved tubular body is sized to be partially received within the fishing rod holder receiving bore in a manner such that the curved segment is disposed exterior to the bore and proximate to an end of the gunwale.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which:

FIG. 1 presents an isometric view of a releasably attachable boat rail according to a first embodiment of the present invention depicting a small reach or span variant;

FIG. 2 presents an isometric view of a releasably attachable boat rail according to a second embodiment of the present invention depicting a medium reach or span variant;

FIG. 4 presents an isometric view of a releasably attachable boat rail according to a fourth embodiment of the present invention adapted for use with a kayak or canoe;

FIG. 5 presents an isometric view of a releasably attachable boat rail according to a fifth embodiment adapted to support a cleat;

FIG. 16 presents an exploded side view of the lower portion of the releasably attachable boat rail illustrating an alternate embodiment locking feature; and FIG. 17 presents a side view of the assembled lower portion illustrated in FIG. 16.

Like reference numerals refer to like parts throughout the several views of the drawings.

DETAILED DESCRIPTION

Figure 3:
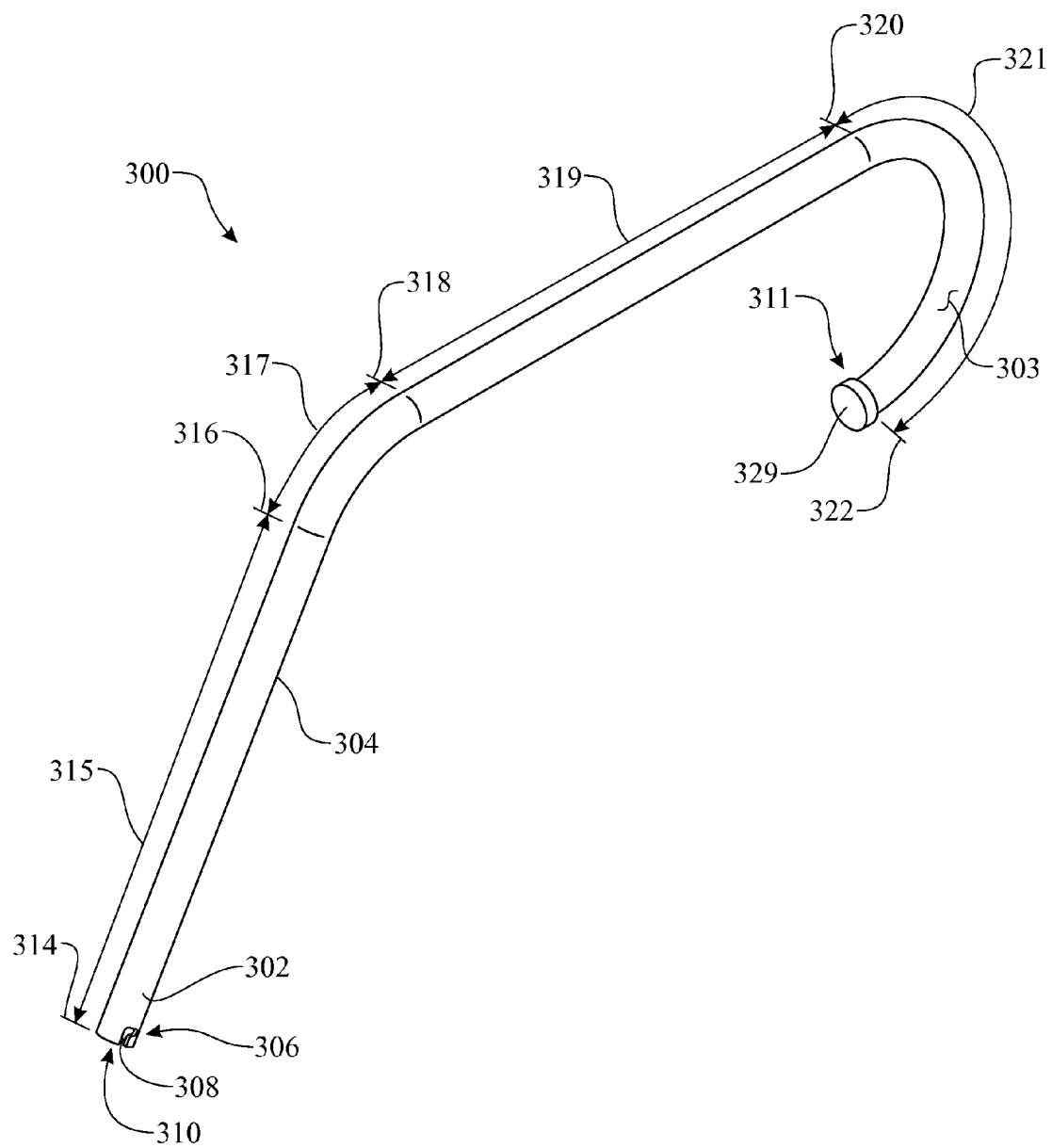
FIG. 3 presents an isometric view of a releasably attachable boat rail according to a third embodiment of the present invention depicting a long reach or span variant.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring initially to FIG. 1, a releasable attachable boat rail 100 for assisting individuals in boarding watercraft is presented illustrating a small reach or span variant 100. The boat rail 100 includes an unitary elongated tubular body 104 spanning a length 115 extending linearly from a first demarcation point 114 at a first tubular body end 110 to a second demarcation point 116. The unitary elongated tubular body 104 begins to curve at the second demarcation point 116 and transitions to a curvature 117 that extends from the second demarcation point 116 to a third demarcation point 118 at a second tubular body end 111. In the exemplary embodiment, the curvature 117 is arcuate within a range of a 180 to 210 degree angle and most preferably at a 210 degree angle to provide a curved gripping surface area 103 of the boat rail 100. The angle of the curvature 117 may vary in degree depending on the desired curved gripping surface area 103.

The unitary elongated tubular body 104 further includes an end cap 129 fittingly engaged over an opening (not shown) defined by a circumferential edge of the second tubular body end 111. The end cap 129 can be sized and configured to be secured over the circumferential edge of the second tubular body end 111, as shown in the exemplary implementation. Alternatively, the end cap 129 can be sized and configured to fit within the circumferential edge of the tubular body end 111, such that a circular rim of the end cap 129 sits substantially flush with the circumferential edge of the tubular body end 111. It is understood that the end cap 129 can be of any configuration, provided that it seals an otherwise open end of the unitary elongated tubular body 104.

Figure 8:
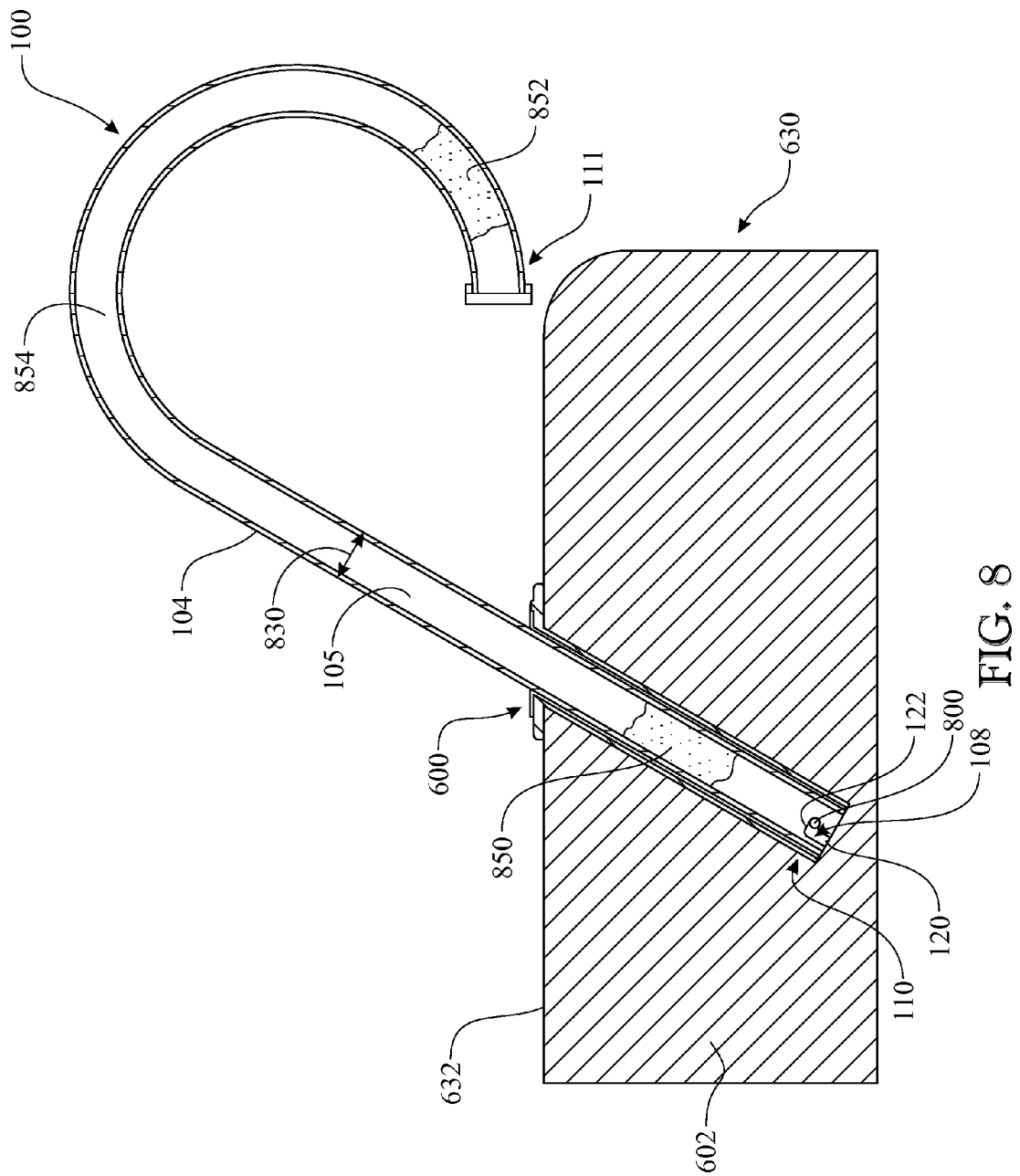
FIG. 8 presents a sectional view of the assembled releasably attachable boat rail of FIG. 7, illustrating a locking feature and expandable foam inserts.

A locking portion 106 is integrated at the first tubular body end 110 of the unitary elongated tubular body 104. The locking portion 106 forms as a channel cutout 108 of a sidewall 102 of the unitary elongated tubular body 104 adapted to releasably interlock with a locking pin 800, as best illustrated in FIG. 8 and described in detail below.

Referring now primarily to FIG. 2, a releasably attachable boat rail 200 according to a second embodiment is presented, illustrating a medium reach or span variant 200. Such an embodiment is adapted for use in aiding in the boarding of watercraft in which additional overall device length is required (as will be described in greater detail below with reference to FIG. 10). Like features of the releasably attachable boat rail 200 and releasably attachable boat rail 100 are numbered the same except preceded by the numeral '2'.

The boat rail 200 includes an unitary elongated tubular body 204 spanning a first length 215 extending linearly from a first demarcation point 214 at a first tubular body end 210 to a second demarcation point 216. The unitary elongated tubular body 204 begins to curve at the second demarcation point 216 and transitions to a first curvature 217 that extends from the second demarcation point 216 to a third demarcation point 218. In the exemplary embodiment, the first curvature 217 bends at a 60 degree angle, defining an angular transition of the boat rail 200. At the third demarcation point 218, the unitary elongated tubular body 204 extends linearly a second length 219 from the third demarcation point 218 to a fourth demarcation point 220. The second length 219 forms an intermediate extension arm providing an overall greater length as compared to the boat rail 100 (as will be described in greater detail below with reference to FIG. 10). The unitary elongated tubular body 204 begins to curve again at the fourth demarcation point 220, defining a second curvature 221 that extends from the fourth demarcation point 220 to a fifth demarcation point 222 at a second tubular body end 211. In the exemplary embodiment, the second curvature 221 is arcuate within a range of a 120 to 180 degree angle and most preferably at a 150 degree angle to provide a curved gripping surface area 203 of the boat rail 200. The angle of the second curvature 221 may vary in degree depending on the desired curved gripping surface area 203.

The unitary elongated tubular body 204 further includes an end cap 229 fittingly engaged over an opening (not shown) defined by a circumferential edge of the second tubular body end 211. A locking portion 206 is integrated at the first tubular body end 210 of the unitary elongated tubular body 204. The locking portion 206 forms as a channel cutout 208 of a sidewall 202 of the unitary elongated tubular body 204 adapted to releasably interlock with a locking pin 800, as best illustrated in FIG. 8 and described in detail below.

Referring now primarily to FIG. 3, a releasably attachable boat rail 300 according to a third embodiment is presented, illustrating a large reach or span variant 300. Such an embodiment is adapted for use in aiding in the boarding of watercraft in which additional overall device length is required (as will be described in greater detail below with reference to FIG. 11). Like features of the releasably attachable boat rail 300 and both the releasably attachable boat rail 200 and the releasably attachable boat rail 100 are numbered the same except preceded by the numeral '3'.

The boat rail 300 includes an unitary elongated tubular body 304 spanning a first length 315 extending linearly from a first demarcation point 314 at a first tubular body end 310 to a second demarcation point 316. The unitary elongated tubular body 304 begins to curve at the second demarcation point 316 and transitions to a first curvature 317 that extends from the second demarcation point 316 to a third demarcation point 318. In the exemplary embodiment, the first curvature 317 bends at a 60 degree angle, defining an angular transition of the boat rail 300. At the third demarcation point 318, the unitary elongated tubular body 304 extends linearly a distance from the third demarcation point 318 to a fourth demarcation point 320, defining a second length 319. The second length 319 forms an intermediate extension arm providing an overall greater length as compared to the boat rail 200 and boat rail 100 (as will be described in greater detail below with reference to FIG. 10). The unitary elongated tubular body 304 begins to curve again at the fourth demarcation point 320, defining a second curvature 321 that extends from the fourth demarcation point 320 to a fifth demarcation point 322 at a second tubular body end 311. In the exemplary embodiment, the second curvature 321 is arcuate within a range of a 120 to 180 degree angle and most preferably at a 150 degree angle to provide a curved gripping surface area 303 of the boat rail 300. The angle of the second curvature 321 may vary in degree depending on the desired curved gripping surface area 303.

The unitary elongated tubular body 304 further includes an end cap 329 fittingly engaged over an opening (not shown) defined by a circumferential edge of the second tubular body end 311. A locking portion 306 is integrated at the first tubular body end 310 of the unitary elongated tubular body 304. The locking portion 306 forms as a channel cutout 308 of a sidewall 302 of the unitary elongated tubular body 304 adapted to releasably interlock with a locking pin 800, as best illustrated in FIG. 8 and described in detail below.

Referring now primarily to FIG. 4, a releasably attachable boat rail 400 according to a fourth embodiment is presented, illustrating a releasably attachable boat rail 400 adapted for use in aiding the boarding of vessels such as a kayak 710 (FIG. 13), canoe, row boat, and the like. Like features of the releasably attachable boat rail 300 and releasably attachable boat rail 200 and releasably attachable boat rail 100 are numbered the same except preceded by the numeral '4,' unless otherwise stated.

The boat rail 400 includes a unitary elongated tubular body 404 and a tubular segment 430 affixed at an end thereof. The unitary elongated tubular body 404 spans a length 415 extending linearly from a first demarcation point 414 at a first tubular body end 410 to a second demarcation point 416. The unitary elongated tubular body 404 beings to curve at the second demarcation point 416 and transitions to a first curvature 417, providing an angular transition of the boat rail 400, and terminating at a third demarcation point 418. In the exemplary embodiment, the curvatures 417 and 419 bend to make a 60 degree angle, defining an angular transition of the boat rail 400. The tubular segment 430 begins to curve at the third demarcation point 418, defining a second curvature 419 beginning at the third demarcation point 418 and terminating at a fourth demarcation point 420. The second curvature 419 transitions to a length 421, extending linearly from the fourth demarcation point to a fifth demarcation point 422 at a tubular segment end 411, the tubular segment 430 defining a gripping handle and providing a gripping surface area 403 of the boat rail 400. In the exemplary embodiment, the diameter 432 of the unitary elongated tubular body 404 is smaller than the diameter 434 of the tubular segment 430. The angle of the curvature 419 of the tubular segment 430 may vary in degree depending on the desired orientation of the gripping surface area 403.

The unitary elongated tubular body 404 further includes an end cap 429 fittingly engaged over an opening (not shown) defined by a circumferential edge of the second tubular body end 411. A locking portion 406 is integrated at the first tubular body end 410 of the unitary elongated tubular body 404. The locking portion 406 forms as a channel cutout 408 of a sidewall 402 of the unitary elongated tubular body 404 adapted to releasably interlock with a locking pin 800, as best illustrated in FIG. 8 and described in detail below.

Referring now to FIG. 5, a releasably attachable boat rail 500 is presented, illustrating an alternate embodiment, in which the boat rail 500 is adapted for use in combination with a cleat 550. Like features of the releasably attachable boat rails 100, 200, 300, and 400 are numbered the same except preceded by the number '5', unless otherwise stated.

The boat rail 500 includes an unitary elongated tubular body 504 spanning a first length 515 extending linearly from a first demarcation point 514 at a first tubular body end 510 to a second demarcation point 516. The unitary elongated tubular body 504 begins to curve at the second demarcation point 516 and transitions to a first curvature 517 that extends from the second demarcation point 516 to a third demarcation point 518. In the exemplary embodiment, the first curvature 517 bends at a 60 degree angle, defining an angular transition of the boat rail 500. At the third demarcation point 518, the unitary elongated tubular body 504 extends linearly a distance from the third demarcation point 518 to a fourth demarcation point 520 at a second tubular body end 511, defining a second length 519. The cleat 550 is affixed to a top planar surface 503 at the second length 519 of the unitary elongated tubular body 504.

The unitary elongated tubular body 504 further includes an end cap 529 fittingly engaged over an opening (not shown) defined by a circumferential edge of the second tubular body end 511. A locking portion 506 is integrated at the first tubular body end 510 of the unitary elongated tubular body 504. The locking portion 506 forms a channel cutout 508 of a sidewall 502 of the unitary elongated tubular body 504 adapted to releasably interlock with a locking pin 800, as best illustrated in FIG. 8 and described in detail below.

Figure 6:
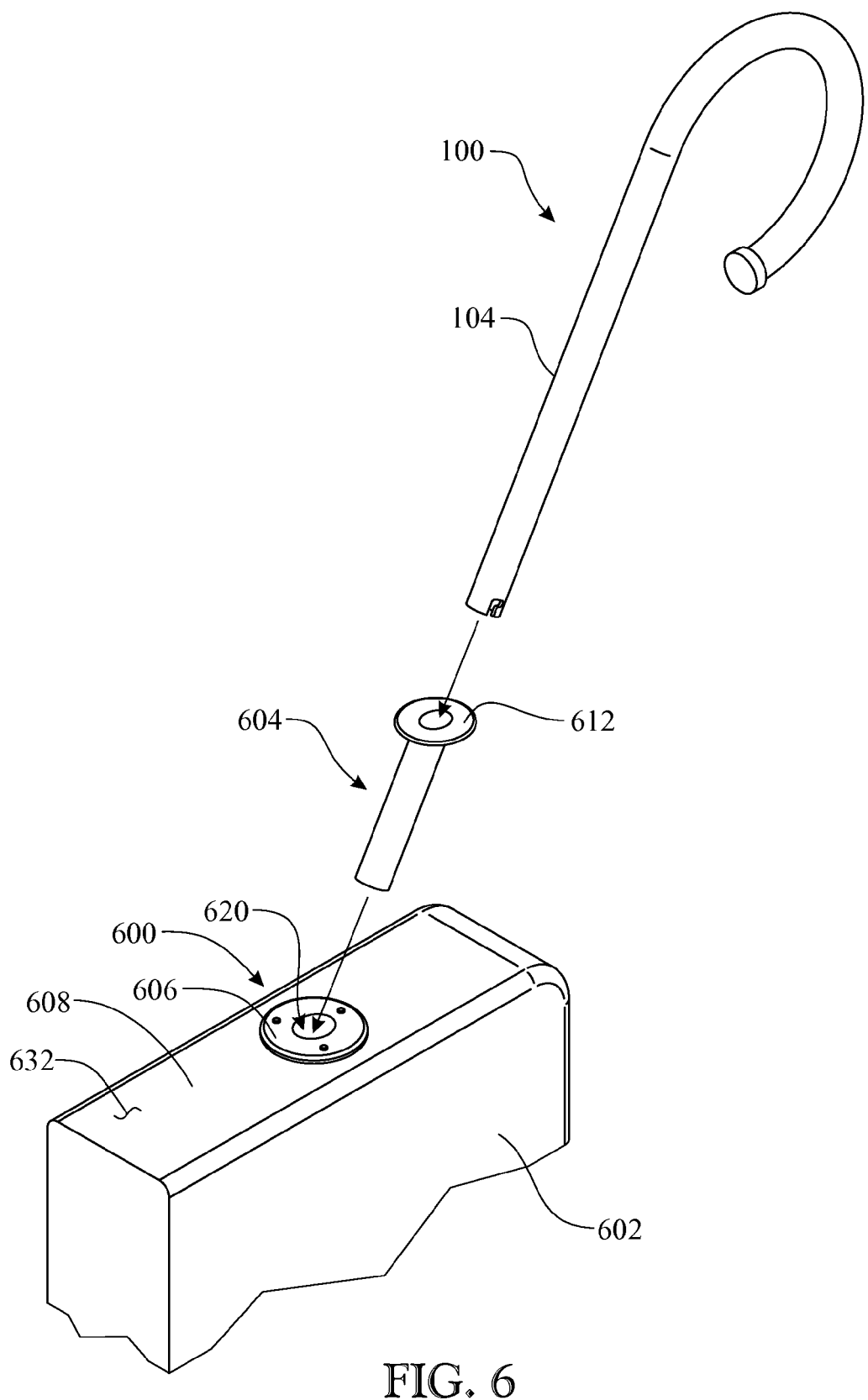
FIG. 6 presents an isometric exploded view of the releasably attachable boat rail originally introduced in FIG. 1 being inserted into a fishing rod holder bore on the boat.
Figure 7:
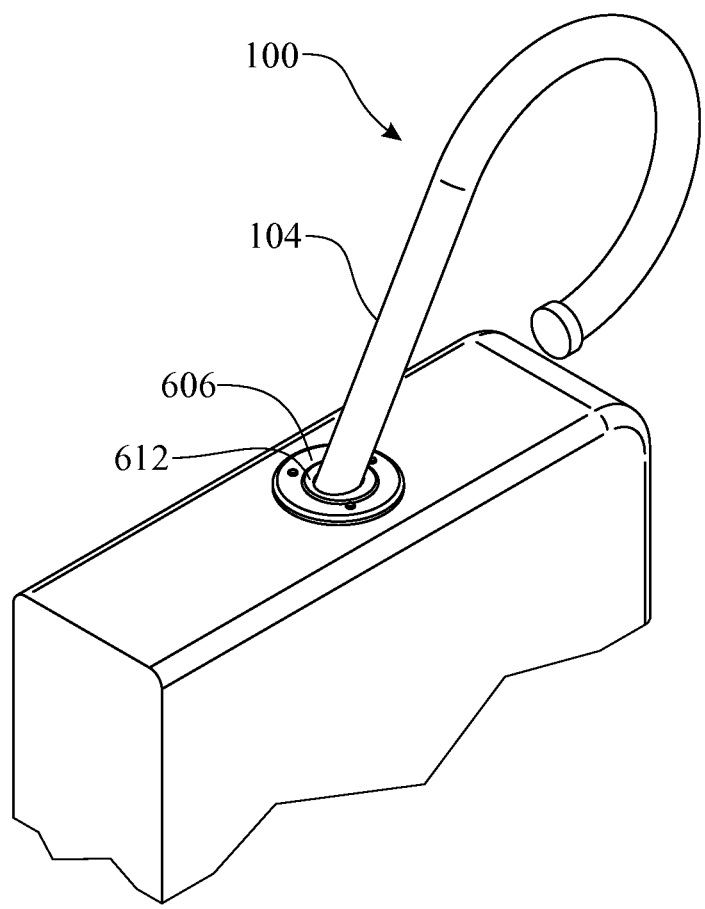
FIG. 7 presents an isometric assembled view of the releasably attachable boat rail originally introduced in FIG. 1 inserted into the bore on the boat in an alternate angular configuration.

Referring now to FIG. 6 through FIG. 8, the apparatus for aiding in the boarding of watercraft according to the first exemplary embodiment of the boat rail 100 is illustrated in greater detail being inserted into a receiving bore 600, formed as a preexisting feature and fixture in the gunwale 602 of a vessel, namely a fishing rod bore 600. It is understood that, while FIGS. 6 through 8 depict the functionality of the first exemplary embodiment boat rail 100, identical functions and feature exist with respect to alternative described and depicted embodiments of the boat rail 200, 300, 400, and 500, unless otherwise stated. Accordingly, the description herein should be considered exemplary for all such variations of the invention, unless otherwise stated.

A fishing rod holder bore sleeve 604 is provided as an insert or a liner for placement directly into the receiving bore 600. The fishing rod holder receiving bore 600 includes a receiving bore flange 606 affixed to or otherwise mounted to an upper surface 632 of a planar top edge 608 of the gunwale 602 and generally flush with the upper surface 632. The bore sleeve 604 is generally tubular shaped and is bounded at an upper end of the bore sleeve 604 by a bore sleeve upper flange 612. The bore sleeve 604 is configured to be fittingly engaged within the cavity 620 defined by the receiving bore 600. As best shown in FIGS. 6-8, the bore sleeve upper flange 612 will flush mount against the upper surface of the receiving bore flange 606 of the receiving bore 600. The unitary elongated tubular body 104 is sized and configured to be received within the bore sleeve cavity 620 to provide for a fitted engagement of the boat rail 100 within the receiving bore 600.

It is understood that the receiving bore 600 may be of a standard size and dimension. In conjunction with those designs that are typically commercially available, the unitary elongated tubular body 104 can be formed of a tubular metal pipe material. The bore sleeve 604 can be formed of plastic material of sufficient lubricity to allow for fittingly receiving the unitary elongated tubular body 104 while allowing for subsequent removal of the boat rail 100 from the receiving bore 600.

While it is understood that various materials and techniques may be applied to the construction of the hand rails 100, 200, 300, 400, and 500 of the various illustrated embodiments, for purposes of disclosure, and by way of example and not meant as a limitation, the use of round aluminum pipe, stainless steel pipe, polyvinyl chloride (PVC) pipe or other marine suited pipe material of a nominal 1.5 inch outer diameter can be used. In the case of various metal pipes, a wall thickness of sufficient gauge would be considered necessary in order to allow for the necessary radius bending without fracturing, distortion, or adversely affecting the structural integrity of the members. Similarly, sufficient strength should be utilized in order to resist bending or breakage under the stress, strain, and loading of its intended purpose. Further still, having a marine application, the boat rail 100 is preferably made of non-corrosive materials or materials with corrosion resistant coatings.

Now referring primarily to FIG. 8, the unitary elongated tubular body 104, having a circular cross-section, defines a tubular body hollow chamber 105. In the event that the boat rail 100 is made of non-buoyant materials, a mechanism for creating flotation would be considered beneficial in order to allow the boat rail 100 to float if it is unintentionally discharged into the water. The tubular body hollow chamber 105 includes with a first flotation member 850 proximate the first tubular body end 110 and a second flotation member 852 in the tubular body hollow chamber 105 proximate the second tubular body end 111. In the exemplary embodiment, the flotation members 850, 852 are implemented as expandable foam inserts. The spaced apart foam inserts 850, 852 thereby form a central air pocket 854 within the interior cavity of the tubular boat rail 100 between the two pieces of foam 850, 852. Such a structure would provide sufficient buoyancy to allow for easy recovery of the boat rail 100 should it inadvertently fall into a body of water.

While frictionally fitting the unitary elongated tubular body 104 may, in some cases, be sufficient for retention of the unitary elongated tubular body 104 within the receiving bore 600, it is understood that a connection means for mechanically affixing the unitary elongated tubular body 104 within the bore 600 is desirable. Fishing rod holders integrated into a gunwale 602 typically have a pre-existing locking pin 800 projecting outwardly from an interior surface of a tubular sidewall of the receiving bore 600. The channel cutout 108 is configured to allow for selective locking engagement with the locking pin 800.

In the exemplary embodiment, the channel cutout 108 is an L-shaped cutout. The channel cutout 108 includes a vertical channel portion 120 and a horizontal channel portion 122, both channel portions 120, 122 intersecting with one another and perpendicular with respect to each other. The vertical channel portion 120 is sized and configured to slidably receive the locking pin 800 in a vertical direction. While the horizontal channel portion 122 is sized and configured to slidably receive the locking pin 800 in a horizontal direction. It is understood to a person having ordinary skill in the relevant art, in light of the present teachings, that variations of an L-shaped channel cutout 108 may be provided as an equivalent locking mechanism. For example, an alternative cutout shape may T-shaped.

As best illustrated in FIG. 8, when the unitary elongated tubular body 104 is inserted into the receiving bore 600, the locking pin 800 is slidably received into the vertical channel portion 120. Twisting the unitary elongated tubular body 104, such that the locking pin 800 is slidably received into the horizontal channel portion 122 selectively locks the boat rail 100 into the receiving bore 600. Generally vertical removal of the boat rail 100 is prevented. Unlocking the boat rail 100 requires twisting the unitary elongated tubular body 104 such that the locking pin 800 is within the vertical channel portion 120, allowing for generally vertical removal of the boat rail 100 from the receiving bore 600.

Figure 9:
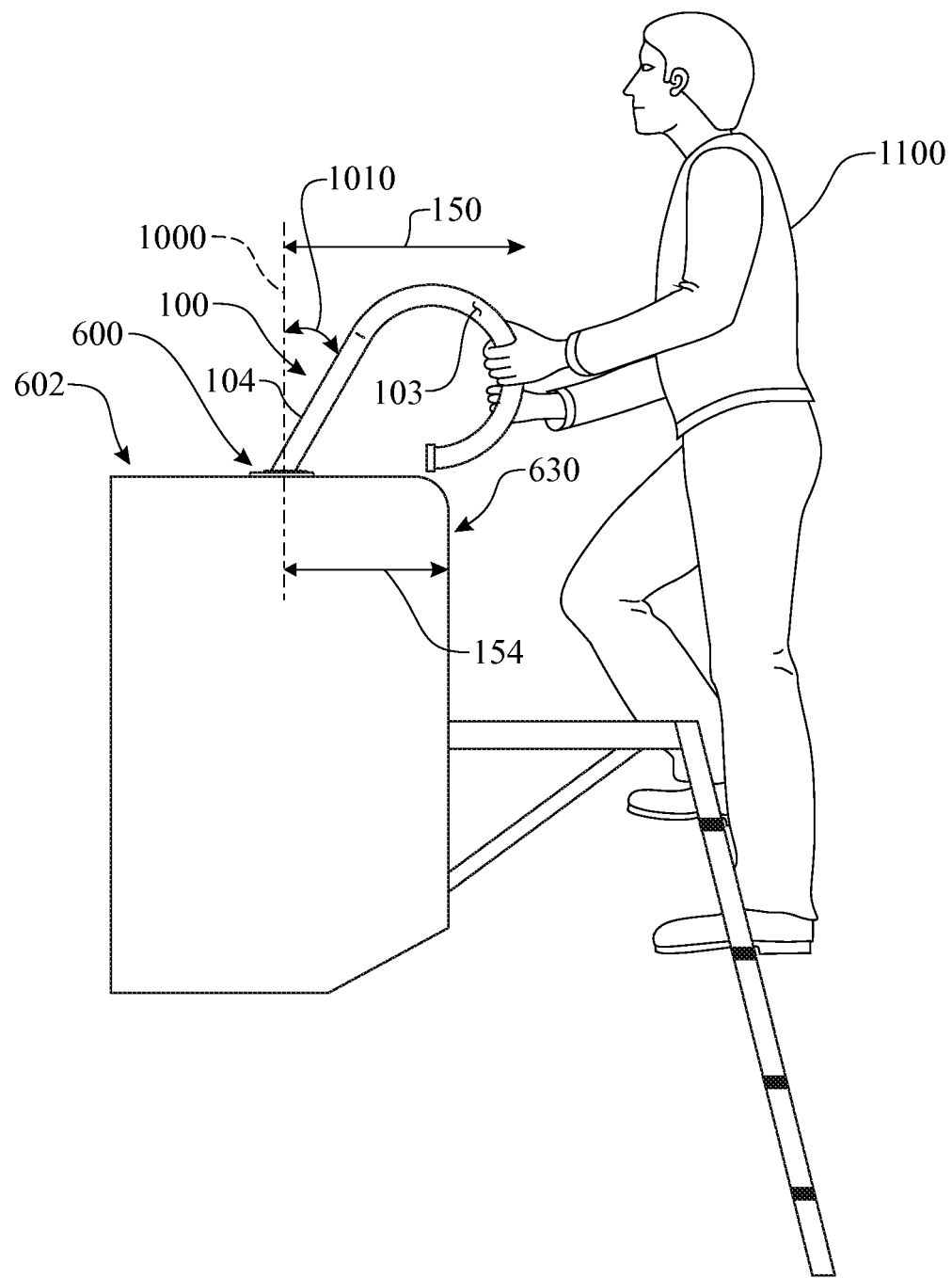
FIG. 9 presents a side view of the releasably attachable boat rail originally introduced in FIG. 1 in use by a passenger of the boat.
Figure 10:
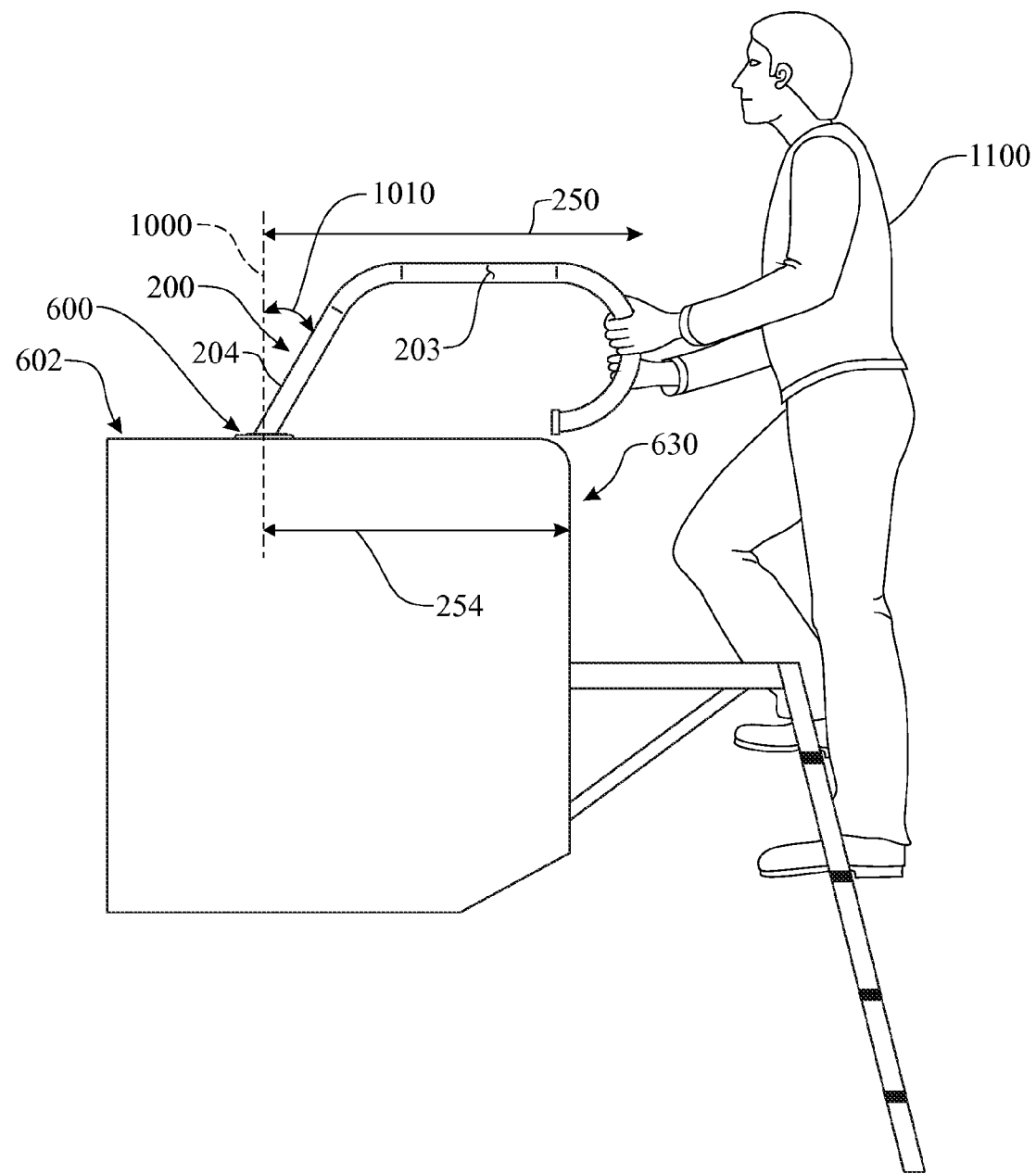
FIG. 10 presents a side view of the releasably attachable boat rail originally introduced in FIG. 2 in use by the passenger of the boat.
Figure 11:
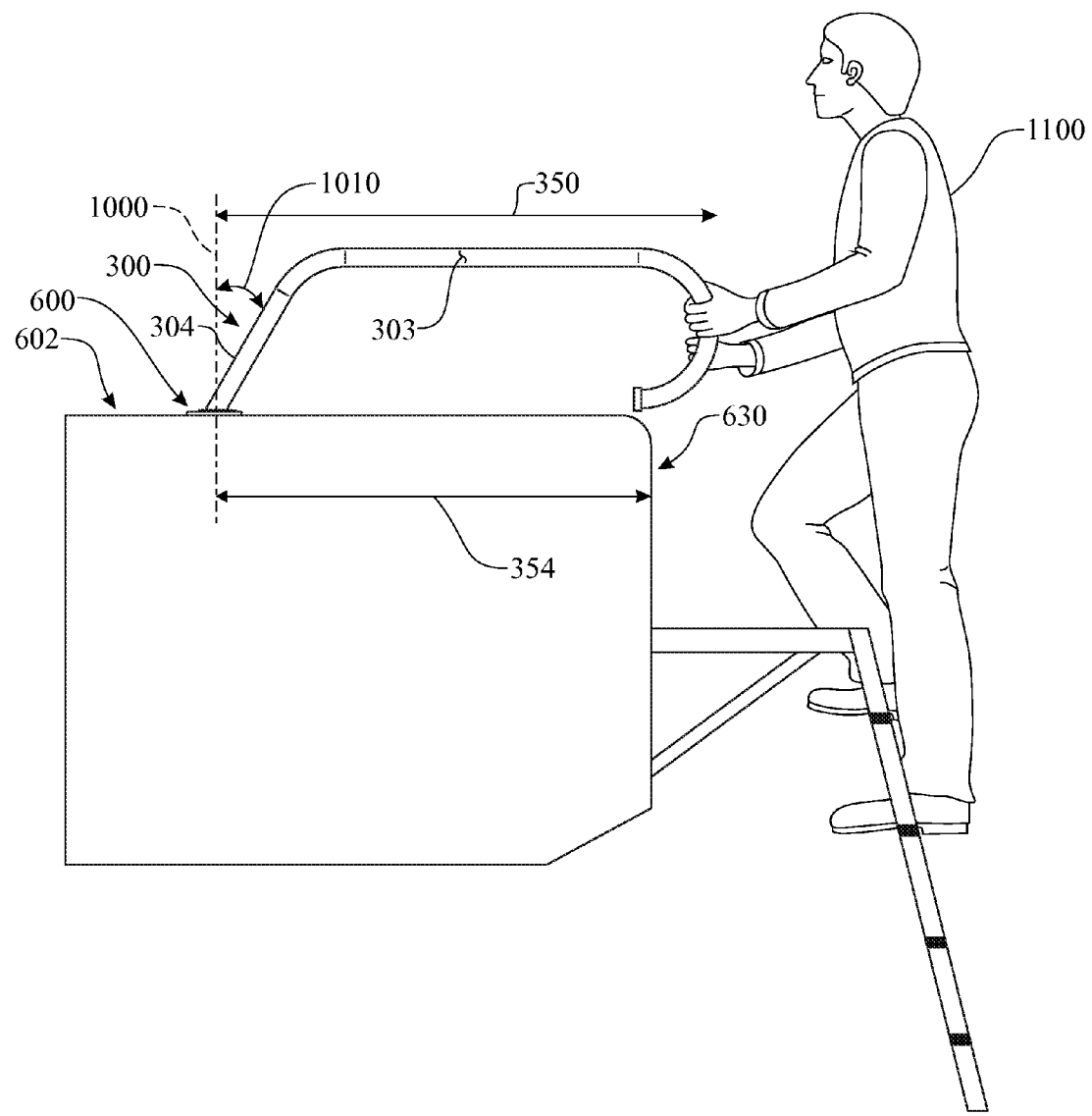
FIG. 11 presents a side view of the releasably attachable boat rail originally introduced in FIG. 3 in use by the passenger of the boat.

In use, the various embodiments as presented in conjunction with FIG. 9 through FIG. 11 are illustrated in greater detail. As best illustrated in FIG. 9 in conjunction with FIG. 8, the small sized variant 100 is inserted into the receiving bore 600 of the gunwale 602, such that the boat rail 100 forms a 30 degree angle 1010 with respect to a vertical axis 1000. Preferably, an overall boat rail distance 150, defined by the portion of the unitary elongated tubular body 104 exterior to the bore 600 (when inserted within the bore 600), is proportional to a partial gunwale distance 154, the partial gunwale distance 154 extending linearly from the receiving bore 600 integrated into the gunwale 602 to an end 630 of a gunwale 602. The boat rail distance 150 provides for the curved gripping surface area 103 to extend beyond the end 630 of the watercraft gunwale 602 when the boat rail 100 is inserted into the receiving bore 600. This allows a passenger 1100 to grip the curved gripping surface area 103 to assist in boarding the vessel.

Now referring to FIG. 10, the medium sized variant 200 is inserted into the receiving bore 600 of the gunwale 602, such that the boat rail 200 forms a 30 degree angle 1010 with respect to a vertical plane 1000. The medium sized variant provides an overall boat rail distance 250, defined by the portion of the unitary elongated tubular body 204 exterior to the bore 600 (when inserted within the bore 600), is proportional to a partial gunwale distance 254, the partial gunwale distance 254 extending linearly from the receiving bore 600 integrated into the gunwale 602 to an end 630 of a gunwale 602. The gunwale distance 254 illustrated in FIG. 10 is greater than the gunwale distance 154 illustrated in FIG. 9. Thus, the medium sized variant 200, spanning a greater length than the small sized variant 100, provides a greater overall boat rail distance 250 for allowing the curved gripping surface area 203 to extend beyond the end 630 of the watercraft gunwale 602 when the boat rail 200 is inserted into the receiving bore 600. This allows the passenger 1100 to grip a curved gripping surface area 203 to assist in boarding the vessel.

Now referring to FIG. 11, the large sized variant 300 is inserted into the receiving bore 600 of the gunwale 602, such that the boat rail 300 forms a 30 degree angle 1010 with respect to a vertical plane 1000. The large sized variant provides an overall boat rail distance 350, defined by the portion of the unitary elongated tubular body 304 exterior to the bore 600 (when inserted within the bore 600), is proportional to a partial gunwale distance 354, the partial gunwale distance 354 extending linearly from the receiving bore 600 integrated into the gunwale 602 to an end 630 of a gunwale 602. The gunwale distance 354 illustrated in FIG. 11 is greater than the gunwale distance 154 and the gunwale distance 254. Thus, the large sized variant 300, spanning a greater length than the small and medium sized variants 100, 200 provides a greater overall boat rail distance 350 for allowing the curved gripping surface area 303 to extend beyond the end 630 of the watercraft gunwale 602 when the boat rail 300 is inserted into the receiving bore 600. This allows the passenger 1100 to grip a curved gripping surface area 303 to assist in boarding the vessel.

As shown throughout FIGS. 9-11, the present invention assists a user 1100 in boarding a marine vessel by providing a hand graspable support positioned at a useful height and location and adapted to be releasable affixed into exiting boat deck hardware and fittings. The small, medium, and large sized embodiments of the boat rail 100, 200, 300 illustrate that the boat rails 100, 200, 300 can be implemented in a multitude of sizes and configurations to provide for a releasably attachable boarding assist device that can be utilized in fishing rod holders integrated into a gunwale 602 at various locations along a length of the gunwale 602.

Figure 12:
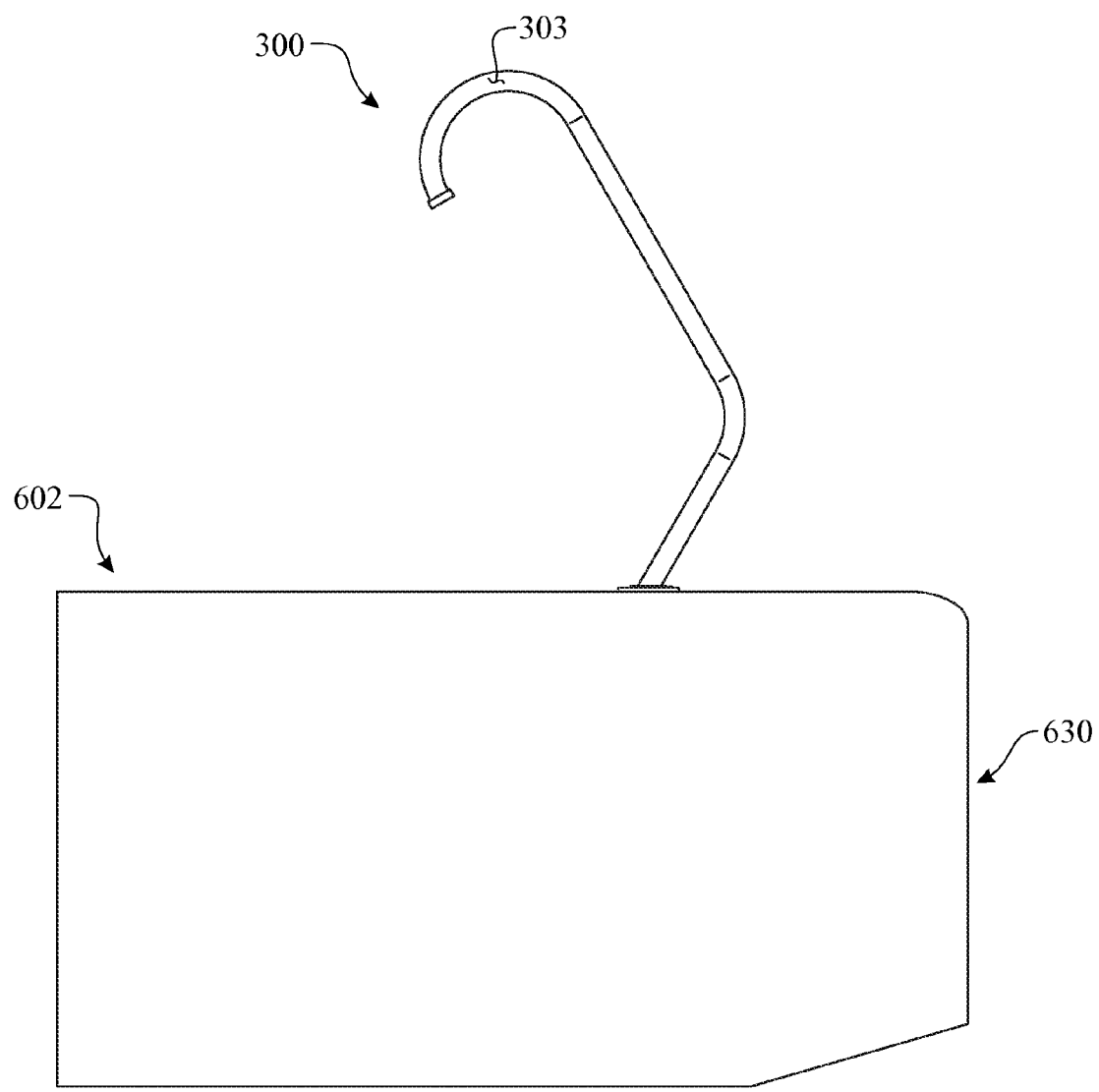
FIG. 12 presents an alternative placement of the releasably attachable boat rail originally introduced in FIG. 3, illustrating placement of the boat rail in an alternate angular configuration.

The boat rail 100, 200, 300, 400, 500 can be inserted at alternative angles within the receiving bore 600, as best illustrated in FIG. 12. For example, the large variant 300 is shown inserted into the receiving bore 600 in an alternate angular orientation, such that the curved gripping surface area 303 extends inwardly, away from the end 630 of the gunwale 602.

Figure 13:
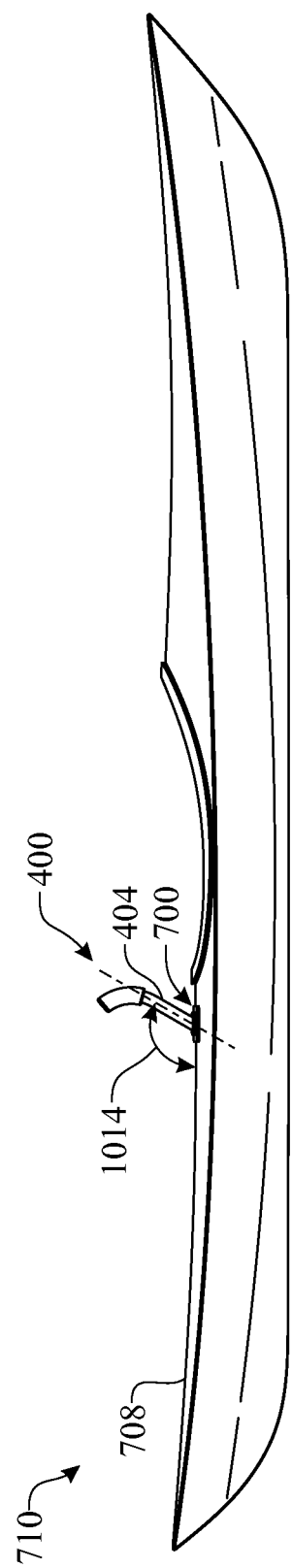
FIG. 13 presents a side view of the releasably attachable boat rail originally introduced in FIG. 4, illustrating the boat rail in use on a kayak.

Now referring to FIG. 13, the boat rail 400 is shown inserted into a receiving bore 700 integrated into a kayak 710. The boat rail 400 is inserted within the receiving bore 700 such that the unitary elongated tubular body 404 forms an obtuse angle 1014 with respect to a generally planar top edge 708 of the kayak 710.

Figure 14:
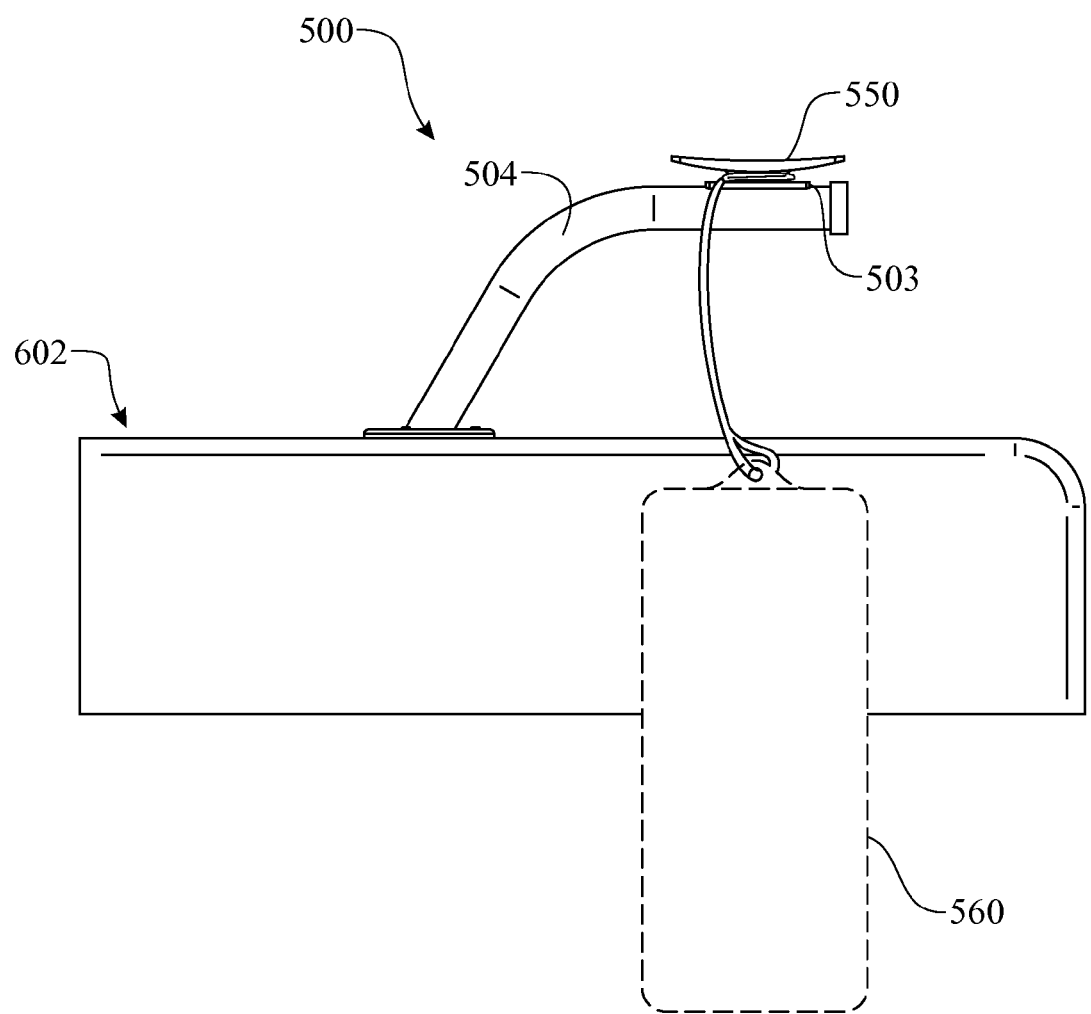
FIG. 14 presents a side view of the releasably attachable boat rail originally introduced in FIG. 5, illustrating the cleat in use.

As best illustrated in FIG. 14, the alternate embodiment described above in conjunction with FIG. 5 provides for a cleat 550 that is affixed to the top planar surface 503 spanning across the second length 519 of the unitary elongated tubular body 504 of the boat rail 500 for mounting any number of miscellaneous deck hardware elements, particularly a cleat 550 on which a fender 560 can be placed. While shown herein as a cleat 550, it is understood to a person having ordinary skill in the relevant art, in light of the present teachings and innovations, that various other types of boating hardware may be equivalently substituted including, but not limited to, cleats, chocks, catches, latches, hooks, handles, pulls, rings, gudgeons, pintles, and other types of commonly available hardware that may be useful and require an attachment fixation point not otherwise available on the vessel's deck or gunwale 602.

Figure 15:
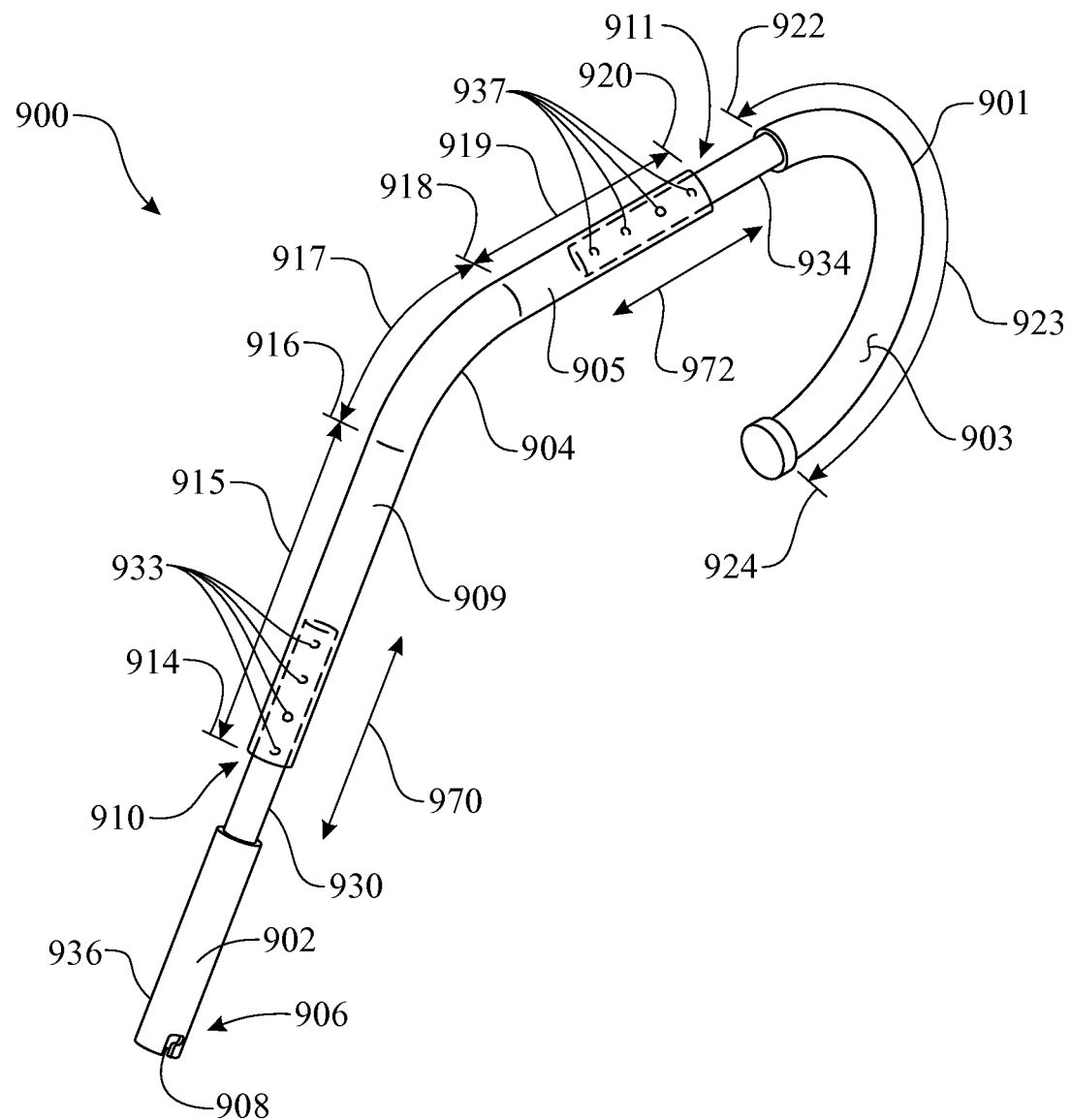
FIG. 15 presents an isometric view of an adjustable embodiment of the releasably attachable boat rail, illustrating telescoping features wherein both a length and height of the boat rail are adjustable.

As discussed above, the boat rail 100, 200, 300 can be implemented in a multitude of sizes and configurations to be utilized in fishing rod holders 600 integrated into a gunwale 602 at various locations along the length of the gunwale 602. Alternatively, an adjustable boat rail 900 is presented in FIG. 15, in which a telescoping boat rail 900 is adjustable in length as well as in height. Like features of the releasably attachable boat rails 100, 200, 200, 400 and 500 are numbered the same except preceded by the number '9,' unless otherwise stated.

The telescoping boat rail 900 includes an unitary elongated tubular body 904 releasably engaged in a telescoping manner to a locking end tubular segment 936 at a first tubular body end 910 and releasably engaged in a telescoping manner to a curved tubular gripping segment 901 at an opposing second tubular body end 911 of the unitary elongated tubular body 904. The unitary elongated tubular body 904 spans a first length 915 extending linearly from a first demarcation point 914 at the first tubular body end 910 to a second demarcation point 916. The unitary elongated tubular body 904 begins to curve at the second demarcation point 916 and transitions to a first curvature 917 that extends from the second demarcation point 916 to a third demarcation point 918. In the exemplary embodiment, the first curvature 917 bends at a 60 degree angle, defining an angular transition of the telescoping boat rail 900. At the third demarcation point 918, the unitary elongated tubular body 904 extends linearly a second length 919 from the third demarcation point 918 to a fourth demarcation point 920. The curved tubular gripping segment 901 provides a second curvature 923 of the boat rail 900, the second curvature 923 beginning at a fifth demarcation point 922 and terminating at a sixth demarcation point 924. In the exemplary embodiment, the second curvature 923 bends at a 150 angle to provide a curved gripping surface area 903 of the boat rail 900. The angle of the second curvature 923 may vary in degree depending on the desired curved gripping surface area 903.

The telescoping boat rail 900 is adjustable in height 970, having a locking end telescoping segment 930 affixed to the locking end tubular segment 936, the locking end telescoping segment 930 configured to be slidably inserted into a hollow tubular locking end chamber 909 within the unitary elongated tubular body 904 at the first length 915. The locking end telescoping segment 930 further includes locking end telescoping apertures 933 at an end thereof, the locking end telescoping apertures 933 adapted to receive a locking end telescoping locking pin (not shown) extending inwardly from an interior surface of the unitary elongated tubular body 904 at the first length 915.

Likewise, the telescoping boat rail 900 is adjustable in length 972, having a gripping end telescoping segment 934 affixed to the curved tubular gripping segment 901, the gripping end telescoping segment 934 configured to be slidably inserted into a hollow tubular gripping member chamber 905 within the unitary elongated tubular body 904 at the second length 919. The gripping end telescoping segment 934 further includes gripping end telescoping apertures 937 at an end thereof, the gripping end telescoping apertures 937 adapted to receive a gripping end telescoping locking pin (not shown) extending inwardly from an interior surface of the unitary elongated tubular body 904 at the second length 919. A user can selectively adjust the length 972 and the height 970 of the telescoping boat rail 900 by inserting the locking pin within a corresponding selected aperture 937, 933.

A locking portion 906 is integrated at an end of the locking end tubular segment 936. The locking portion 906 formed as an L-shaped channel cutout 908 of a sidewall 902 of the locking end tubular segment 936 adapted to releasably interlock with a locking pin 800 (FIG. 8).

Turning now to FIGS. 16-17, an alternate embodiment body configuration 1200 has a unitary elongated tubular body 1204 having a circular cross-section and defining an internal diameter 1205 and terminating at a lower end 1206. A lock fitting 1220 has a cylindrical body 1224 of a diameter substantially equal to the outer diameter of the tubular body 1204. The cylindrical body 1224 defines an L-shaped channel cutout 1208 at a bottom end 1222 thereof adapted to releasably interlock with a locking pin 800 (FIG. 8). The lock fitting 1220 further includes a neck 1226 at an opposite end and has a circular cross section of a diameter substantially equal to the diameter 1205 of the tubular body 1204. The cylindrical body 1224 and the neck 1226 defining a shoulder 1225 therebetween. The neck 1226 is received into the inner diameter 1205 of the tubular body 1204 and the shoulder 1225 bears against the lower end 1206 of the tubular body 1204. The next 1226 is secured to the lower end 1206 utilizing methods known in the art including, but not limited to, welding, gluing, interference fit, etc. depending upon the materials utilized to fabricate the tubular body 1204 and the lock fitting 1220.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A releasable boat rail for assisting passengers aboard a boat wherein said releasable boat rail is received in a receiving bore of a fishing rod holder integrated into a gunwale of the boat and further wherein the receiving bore includes a locking feature therein, said releasable boat rail comprising:
   a unitary elongated tubular body, comprising a linear segment received in said receiving bore of the fishing rod holder and extending from a first end of the unitary elongated tubular body to a second end of said linear segment, said unitary elongated tubular body transitioning at said second end of said linear segment to a curved segment terminating at an opposite second end of the unitary elongated tubular body and describing an arc of curvature that points said opposite second end of said unitary elongated tubular body toward said linear segment thereof, said curved segment providing a curved gripping surface area; and a locking portion defined in a sidewall of said linear segment of said unitary elongated tubular body at said first end thereof, said locking portion formed to engage the locking feature in the receiving bore of the fishing rod holder;

wherein said linear segment of said unitary elongated tubular body is sized to be partially received within the fishing rod holder receiving bore in a manner such that a portion of said linear segment extends from said receiving bore and said curved segment is disposed exterior to the bore and proximate to an end of the gunwale.

2. The releasable boat rail according to claim 1 wherein the locking feature in the receiving bore of the fishing rod holder includes a locking pin affixed to an interior sidewall of the fishing rod holder and extending inwardly to the receiving bore, and wherein said locking portion defined in said sidewall of said linear segment of said unitary elongated tubular body comprises:

a channel cutout of said sidewall of said linear segment of said unitary elongated tubular body at said first end thereof and being adapted for selective locking engagement with the locking pin, said channel cutout including a first linear longitudinal channel and a second circumferential channel perpendicular to and intersecting the first linear longitudinal channel.

3. A releasable boat rail for assisting passengers aboard a boat wherein said releasable boat rail is received in a receiving bore of a fishing rod holder integrated into a gunwale of the boat and further wherein the receiving bore includes a locking feature therein, said releasable boat rail comprising:

a unitary elongated tubular body, comprising a linear segment extending from a first end of the unitary elongated tubular body to a second end of said linear segment, said unitary elongated tubular body transitioning at said second end of said linear segment to a curved segment, said curved segment terminating at an opposite second end of the unitary elongated tubular body, said curved segment providing a curved gripping surface area; and a locking portion defined in a sidewall of said linear segment of said unitary elongated tubular body at said first end thereof, said locking portion formed to engage the locking feature in the receiving bore of the fishing rod holder;

wherein said unitary elongated tubular body is sized to be partially received within the fishing rod holder receiving bore in a manner such that said curved segment is disposed exterior to the bore and proximate to an end of the gunwale, and wherein said unitary elongated tubular body defines a tubular body hollow chamber, said hollow chamber including therein a first flotation member proximate to said first end of said unitary elongated tubular body and a second flotation member proximate to said second end of said unitary elongated tubular body.

4. The releasable boat rail according to claim 3 wherein said first and second flotation members are formed of an expandable foam.

5. The releasable boat rail according to claim 4 wherein said first and second flotation members are spaced apart one from the other and form in combination with said elongated tubular body a central air pocket therebetween.

6. A releasable boat rail for assisting passengers aboard a boat wherein said releasable boat rail is received in a receiving bore of a fishing rod holder integrated into a gunwale of the boat and further wherein the receiving bore includes a locking feature therein, said releasable boat rail comprising:

a unitary elongated tubular body, comprising a linear segment extending from a first end of the unitary elongated tubular body to a second end of said linear segment, said unitary elongated tubular body transitioning at said second end of said linear segment to a curved segment, said curved segment terminating at an opposite second end of the unitary elongated tubular body, said curved segment providing a curved gripping surface area; and a locking portion defined in a sidewall of said linear segment of said unitary elongated tubular body at said first end thereof, said locking portion formed to engage the locking feature in the receiving bore of the fishing rod holder;

wherein said unitary elongated tubular body is sized to be partially received within the fishing rod holder receiving bore in a manner such that said curved segment is disposed exterior to the bore and proximate to an end of the gunwale, and wherein said curved segment is a circular arc describing a range of 120 degrees to 180 degrees.

7. The releasable boat rail according to claim 6 wherein said curved segment is a circular arc substantially describing 150 degrees.

8. A releasable boat rail for assisting passengers aboard a boat wherein said releasable boat rail is received in a receiving bore of a fishing rod holder integrated into a gunwale of the boat and further wherein the receiving bore includes a locking feature therein, said releasable boat rail comprising:

a unitary elongated tubular body, comprising a linear segment extending from a first end of the unitary elongated tubular body to a second end of said linear segment, said unitary elongated tubular body transitioning at said second end of said linear segment to a curved segment, said curved segment terminating at an opposite second end of the unitary elongated tubular body, said curved segment providing a curved gripping surface area; and a locking portion defined in a sidewall of said linear segment of said unitary elongated tubular body at said first end thereof, said locking portion formed to engage the locking feature in the receiving bore of the boat gunwale;

wherein said unitary elongated tubular body is sized to be partially received within the fishing rod holder receiving bore in a manner such that said curved segment is disposed exterior to the bore and proximate to an end of the gunwale, and wherein said locking portion includes a lock fitting having a cylindrical body defining a channel cutout at one end thereof and a neck at an opposite end thereof, said neck telescopically received in said first end of said unitary elongated tubular body.

9. A releasable boat rail for assisting passengers aboard a boat wherein said releasable boat rail is received in a receiving bore of a fishing rod holder integrated into a gunwale of the boat and further wherein the receiving bore includes a locking feature therein, said releasable boat rail comprising:

a unitary elongated tubular body, comprising a first linear segment received in said receiving bore of the fishing rod holder and extending from a first end of the unitary elongated tubular body to a second end of said first linear segment, a second linear segment, a first curved segment extending between said second end of said first linear segment and a first end of said second linear segment, and a second curved segment at a second end of said second linear segment describing an arc terminating at an opposite second end of said unitary elongated tubular body, said second curved segment providing a curved gripping surface area, wherein said first curved segment describes an arc of curvature that points said opposite second end of said unitary elongated tubular body, on said second curved segment, toward said first linear segment of said unitary elongated tubular body; and a locking portion defined in a sidewall of said unitary elongated tubular body at said first end thereof, said locking portion formed to engage the locking feature in the receiving bore of the fishing rod holder;

wherein said first linear segment of said unitary elongated tubular body is sized to be partially received within the fishing rod holder receiving bore in a manner such that a portion of said first linear segment extends from said receiving bore and said second curved segment is disposed exterior to the receiving bore and proximate to an end of the gunwale.

10. The releasable boat rail according to claim 9 wherein the locking feature in the receiving bore of the fishing rod holder includes a locking pin affixed to an interior sidewall of the fishing rod holder and extending inwardly to the receiving bore and wherein said locking portion defined in said sidewall of said linear segment of said unitary elongated tubular body comprises:

a channel cutout of said sidewall of said linear segment at said first end of said unitary elongated tubular body being adapted for selective locking engagement with the locking pin, said channel cutout including a first linear longitudinal channel and a second circumferential channel perpendicular to and intersecting the first linear longitudinal channel.

11. A releasable boat rail for assisting passengers aboard a boat wherein said releasable boat rail is received in a receiving bore of a fishing rod holder integrated into a gunwale of the boat and further wherein the receiving bore includes a locking feature therein, said releasable boat rail comprising:

a unitary elongated tubular body, comprising a first linear segment received in said receiving bore of the fishing rod holder and extending from a first end of the unitary elongated tubular body to a second end of said first linear segment, a second linear segment, a first curved segment extending between said second end of said first linear segment and a first end of said second linear segment, and second curved segment at a second end of said second linear segment describing an arc terminating at an opposite second end of said unitary elongated tubular body, said second curved segment providing a curved gripping surface area; and a locking portion defined in a sidewall of said unitary elongated tubular body at said first end thereof, said locking portion formed to engage the locking feature in the receiving bore of the fishing rod holder;

wherein said first linear segment of said unitary elongated tubular body is sized to be partially received within the fishing rod holder receiving bore in a manner such that a portion of said first linear segment extends from the receiving bore and said second curved segment is disposed exterior to the receiving bore and proximate to an end of the gunwale, and wherein said unitary elongated tubular body defines a tubular body hollow chamber, said chamber including a first flotation member proximate to said first end and a second flotation member proximate to said second end.

12. The releasable boat rail according to claim 11 wherein said first and second flotation members are formed of an expandable foam.

13. The releasable boat rail according to claim 12 wherein said first and second flotation members are spaced apart one from the other and form in combination with said elongated tubular body a central air pocket therebetween.

14. A releasable boat rail for assisting passengers aboard a boat wherein said releasable boat rail is received in a receiving bore of a fishing rod holder integrated into a gunwale of the boat and further wherein the receiving bore includes a locking feature therein, said releasable boat rail comprising:

an unitary elongated tubular body, comprising a first linear segment received in said receiving bore of the fishing rod holder and extending from a first end of the unitary elongated tubular body to a second end of said first linear segment, a second linear segment, a first curved segment extending between said second end of said first linear segment and a first end of said second linear segment, and a second curved segment at a second end of said second linear segment describing an arc terminating at an opposite second end of said unitary elongated tubular body, said second curved segment providing a curved gripping surface area; and a locking portion defined in a sidewall of said unitary elongated curved tubular body at said first end thereof, said locking portion formed to engage the locking feature in the receiving bore of the fishing rod holder;

wherein said first linear segment of said unitary elongated tubular body is sized to be partially received within the fishing rod holder receiving bore in a manner such that a portion of said first linear segment extends from the receiving bore and said second curved segment is disposed exterior to the receiving bore and proximate to an end of the gunwale, and wherein said second curved segment is a circular arc describing an arcuate range of 120 degrees to 180 degrees.

15. The releasable boat rail according to claim 14 wherein said second curved segment is a circular arc substantially describing 150 degrees.

16. A releasable boat rail for assisting passengers aboard a boat wherein said releasable boat rail is received in a receiving bore of a fishing rod holder integrated into a gunwale of the boat and further wherein the receiving bore includes a locking feature therein, said releasable boat rail comprising:

an unitary elongated tubular body, comprising a first linear segment received in said receiving bore of the fishing rod holder and extending from a first end of the unitary elongated tubular body to a second end of said first linear segment, a second linear segment, a first curved segment extending between said second end of said first linear segment and a first end of said second linear segment, and a second curved segment at a second end of said second linear segment describing an arc terminating at an opposite second end of said unitary elongated tubular body, said second curved segment providing a curved gripping surface area; and a locking portion defined in a sidewall of said unitary elongated tubular body at said first end thereof, said locking portion formed to engage the locking feature in the receiving bore of the fishing rod holder;

wherein said first linear segment of said unitary elongated tubular body is sized to be partially received within the fishing rod holder receiving bore in a manner such that a portion of said first linear segment extends from the receiving bore and said second curved segment is disposed exterior to the receiving bore and proximate to an end of the gunwale, and wherein said locking portion includes a lock fitting having a cylindrical body defining a channel cutout at one end thereof and a neck at an opposite end thereof, said neck telescopically received in said first end of said unitary elongated tubular body.

17. A releasable boat rail for assisting passengers aboard a boat wherein said releasable boat rail is received in a receiving bore of a fishing rod holder integrated into a gunwale of the boat and further wherein the receiving bore includes a locking feature therein, said releasable boat rail comprising:

an elongated tubular body, comprising
a first linear segment received in said receiving bore of the fishing rod holder and extending from a first end of the elongated tubular body to a second end of said first linear segment, a second linear segment, a first curved segment extending between said second end of said first linear segment and a first end of said second linear segment, and second curved segment at a second end of said second linear segment describing an arc terminating at an opposite second end of said elongated tubular body, said second curved segment providing a curved gripping surface area; and a locking portion defined in a sidewall of said elongated tubular body at said first end thereof, said locking portion formed to engage the locking feature in the receiving bore of the fishing rod holder;

wherein said first linear segment of said elongated tubular body is sized to be partially received within the fishing rod holder receiving bore in a manner such that a portion of said first linear segment extends from the receiving bore and said second curved segment is disposed exterior to the receiving bore and proximate to an end of the gunwale, and wherein at least one of said linear segments is selectively extendable to adjust a length of said at least one linear segment, said at least one extendable linear segment comprising:

a first tube segment having a telescoping segment at one end thereof, said telescoping segment defining a plurality of substantially equally spaced apertures therealong;

a second tube segment receiving said telescoping segment at an end adjacent to said first tube segment, said second tube segment defining at least one aperture proximate to said end adjacent to said first tube segment; and a locking pin engaging said at least one aperture defined by said second tube segment and one of said apertures defined by said telescoping segment.

18. A releasable boat rail for supporting a cleat wherein said releasable boat rail is received in a fishing rod holder receiving bore integrated into a gunwale of the boat and further wherein the receiving bore includes a locking feature therein, said releasable boat rail comprising:

a unitary elongated tubular body, comprising a first linear segment and a second linear segment having first curved segment therebetween, said first curved segment extending between a second end of said first linear segment and a first end of said second linear segment and substantially describing an arc of 60 degrees and said second linear segment further having a top planar surface;

a cleat affixed to said top planar surface of said second linear segment; and a locking portion defined in a sidewall of said elongated curved tubular body at a first end of said first linear segment, said locking portion formed to engage the locking feature in the receiving bore of the boat gunwale; wherein:

said elongated curved tubular body is sized to be partially received within the fishing rod holder receiving bore in a manner such that said curved segment is disposed exterior to the bore and proximate to an end of the gunwale.

* * * * *